United States Patent
Van Dyke

(10) Patent No.: US 6,904,515 B1
(45) Date of Patent: Jun. 7, 2005

(54) MULTI-INSTRUCTION SET FLAG PRESERVATION APPARATUS AND METHOD

(75) Inventor: Don A. Van Dyke, Pleasanton, CA (US)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/436,882

(22) Filed: Nov. 9, 1999

(51) Int. Cl.[7] .............................................. G06F 9/455
(52) U.S. Cl. ....................... 712/226; 712/227; 712/228; 703/26
(58) Field of Search ................................ 712/226, 227, 712/228, 229; 703/26

(56) References Cited

U.S. PATENT DOCUMENTS 5,590,359 A * 12/1996 Sharangpani ................ 712/32
5,832,258 A * 11/1998 Kiuchi et al. ................ 712/226
6,173,394 B1 * 1/2001 Guttag et al. ................ 712/226

FOREIGN PATENT DOCUMENTS

WO    9713194    *  4/1997

* cited by examiner

Primary Examiner—William M. Treat
(74) Attorney, Agent, or Firm—Vedder, Price, Kaufman & Kammholz, P.C.

(57) ABSTRACT

A method and apparatus for processing program instructions, utilizes native fixed length instructions that include at least one flag modification enable bit. The flag modification enable bit is typically sent with the operation code and other information in the native instruction and is set to allow updating of one or more flags, such as stored in flag registers, associated with non-native instructions, such as variable length instructions. In addition, a flag modification enable bit may be set to preserve flag bit setting for variable length instructions that are emulated using the fixed length native instructions, to prevent overwriting of flag settings during emulation of variable length instructions.

20 Claims, 5 Drawing Sheets

MULTI-INSTRUCTION SET FLAG PRESERVATION APPARATUS AND METHOD

FIELD OF THE INVENTION

The invention relates generally to multi-instruction set processing devices and methods and more particularly to multi-instruction set processing devices and methods incorporating instruction emulation of instructions from one instruction set using instructions from the other instruction set.

BACKGROUND OF THE INVENTION

Microprocessors and other instruction execution devices are known that employ variable length instruction sets, such as Intel® X86 family of microprocessors. Also, processors are known that execute different instruction sets, such as a variable length instruction set (e.g., X86 type instructions) and other instruction sets such as fixed length RISC instruction sets. With multi-instruction set processors, variable length instructions are sometimes converted to a plurality of fixed length native instructions to speed up execution of the variable length instruction. For example, an X86 based processor, may use a plurality of RISC instructions that may be fixed length instructions, to represent one or more variable length instructions. Typically, the RISC instructions are executed out of an onboard memory and are user accessible. An arithmetic logic unit, for example, may then receive the RISC instructions and execute the RISC instructions at a more efficient rate. Accordingly, integer instructions and other instructions may be converted from a non-native instruction to one or more native instructions.

However, a problem can arise when variable length instructions, such as normative instructions, require the setting of flags in various flag registers for particular instructions. For example, if a set of variable length instruction are emulated using a plurality of fixed length native instructions and the fixed length native instructions update the flag registers that are used by other non-native instructions, the updating of the flags in the various flag registers during emulation can corrupt the state used by instructions being executed for other arithmetic logic units or other processor elements relying on the other variable length instructions being executed that also rely on the flag settings. One method of solving such a problem may be to save and restore flag states, but this can result in excessive overhead requirements.

Consequently, there exists a need for a method and apparatus for processing program instructions in a multi-instruction set processing device, that helps suitably control the preservation of flag settings for variable length instructions that are emulated using fixed length native instructions.

BRIEF DESCRIPTION OF THE DRAWINGS

The invention will be more readily understood in view of the following drawings wherein.

DETAILED DESCRIPTION OF A PREFERRED EMBODIMENT OF THE INVENTION

Briefly, a method and apparatus for processing program instructions, utilizes native fixed length instructions that include at least one flag modification enable bit. The flag modification enable bit is typically sent with the operation code and other information in the native instruction and is set to allow updating or prevention of updating of one or more flags, such as flags stored in flag registers associated with normative instructions, such as variable length instructions. As such, a flag modification enable bit(s) may be set to preserve flag bit setting for variable length instructions that are emulated using the fixed length native instructions, to prevent overwriting of flag settings during emulation of variable length instructions.

Figure 1:
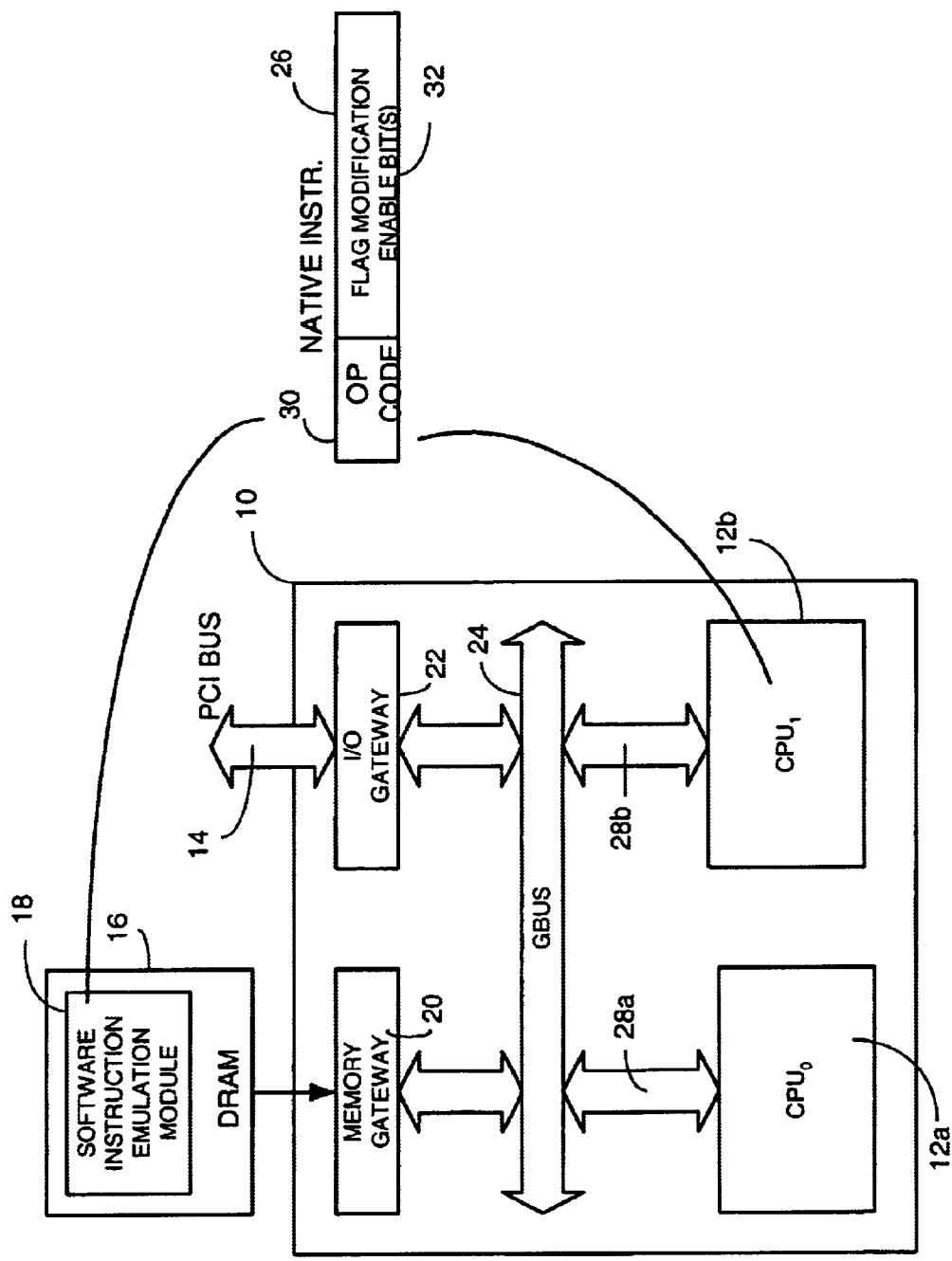
FIG. 1 is a block diagram illustrating one example of a multiple processing device apparatus that employs use of native instructions having flag modification enable data in accordance with one embodiment of the invention.

FIG. 1 illustrates an example of a multi-instruction set processing device 10 that includes a plurality of processing units 12a and 12b, such as microprocessors. The processing device 10 may be, for example, an integrated circuit. The processing device 10 is operatively coupled to other processing devices (not shown) through a suitable bus 14, such as a PCI bus used in personal computers, hand held devices and other portable devices. Memory 16, such as dynamic RAM (DRAM) or any other suitable memory, stores a software instruction emulation module 18 that is used to emulate variable length instructions that are not converted into a plurality of fixed length native instructions, as set forth below.

If desired, the processing device 10 may include a memory gateway 20 and an I/O gateway 22. The memory gateway 20 may be a conventional memory gateway that is operatively coupled to the plurality of processing units 12a and 12b through a general bus 24. Similarly, the I/O gateway 22 may serve as a gateway to allow communication with I/O chips through PCI bus 14. The I/O gateway 22 is operatively coupled to the plurality of processing units 12a and 12b through the bus 24. Each of the processors 12a and 12b receives native instructions 26 or non-native instructions over the general bus 24 through a suitable communication bus 28a and 28b. The native instruction 26 may be, for example, a fixed length instruction from a fixed length instruction set having operational code 30 and one or more flag modification enable bits 32, along with other suitable instruction information. The non-native instruction may be variable byte length instructions, such as X86 type instructions.

The software instruction emulation module 18 contains programming instructions to allow the emulation of variable length instructions, using a plurality of native instructions 26. The software instruction emulation module 18 is preferably run as needed by the plurality of processors 12a and 12b. In a preferred embodiment, the software instruction emulation module 18 is requested to emulate non-native instructions, such as complex variable length instructions, using native instructions 26 containing the flag modification bit 32. The non-native instructions that are emulated are preferably those instructions that are not convertible by an instruction set converter. For example, the emulated variable length instructions may be very complex X86 instructions that may be more quickly implemented and verified using the software emulation module 18 as opposed to a hardware based execution scheme. Some examples of X86 instructions that may be emulated include far call, task gate call and CPUID instructions. The software instruction emulation module 18 has the option of preventing the modification of flags, such as flags set when performing integer operations or other mathematical operations, in a flag register in response to execution of the plurality of native instructions used by the software instruction emulation module 18. Some emulated instruction modify the flags, while others preserve the flag settings. The software emulation module 18 contains instructions with the flag modification bit 32 set to inform the controller to modify or not modify flag settings as required.

In contrast, when variable length instructions are suitably converted into fixed length native instructions by a converter, the arithmetic logic units executing the instructions are allowed to update the associated flags in the flag registers for those converted variable length instructions.

Each of the processors 12a and 12b receive native instructions containing data representing operational code and data representing at least one flag modification enable bit 32 as part of the native instruction. The processors 12a and 12b determine whether the flag modification enable bit 32 allows updating of ALU related flags, in response to executing the operational code. Each of the processors 12a and 12b may update the ALU flags in response to determining the status of the flag modification enable bit 32. For example, if the flag modification enable bit 32 is set to a logical high, indicating that flag modification is enabled, a processor may modify flags in a flag register in response to executing the native code during ALU execution of the native instructions. In contrast, if the flag modification enable bit is set, for example, to a logic zero, indicating flag modification is prevented, the processors are unable to write to the distributed flag register (FIG. 2), as is typically done during emulation of more complex variable length instructions.

Figure 2:
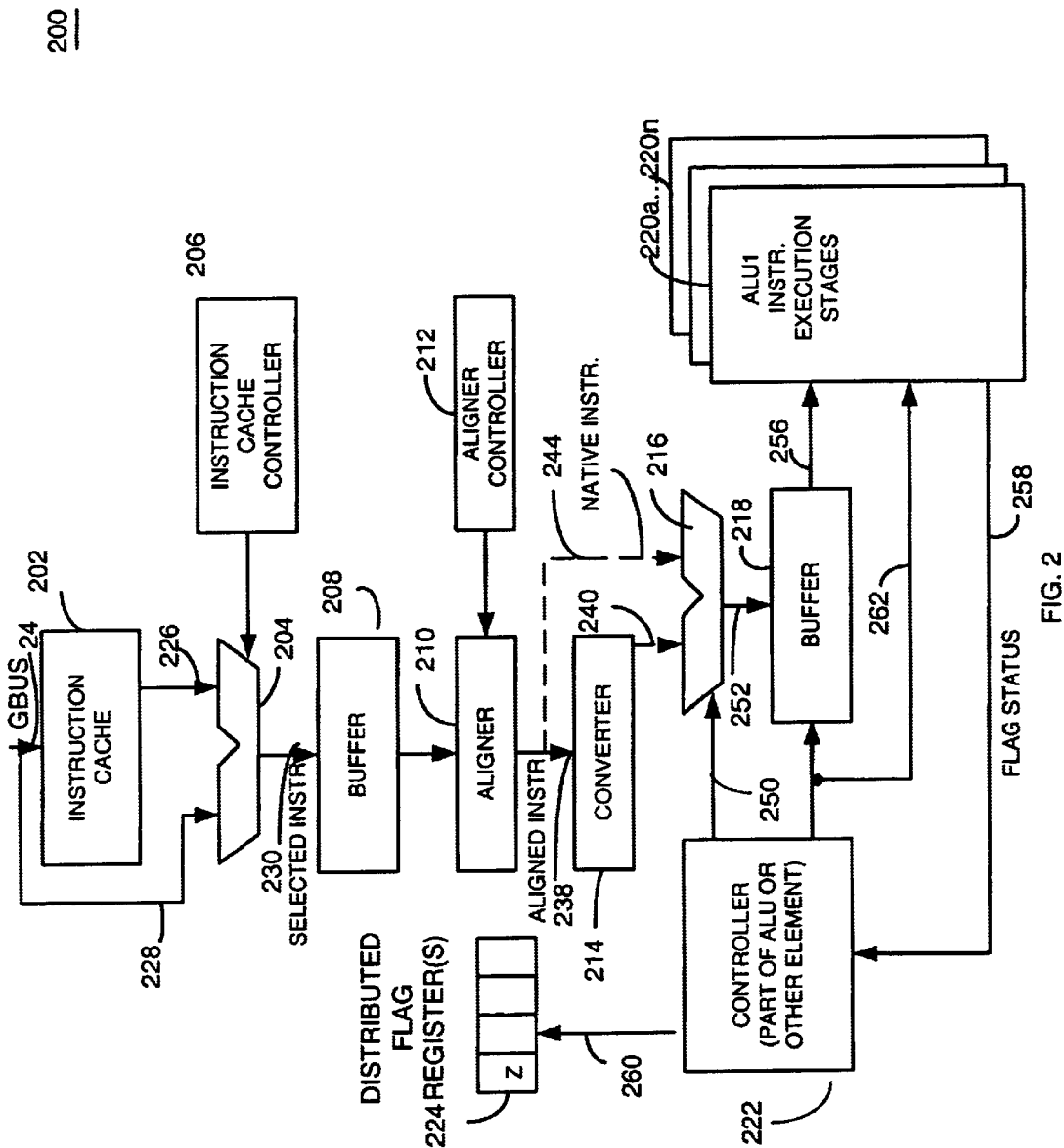
FIG. 2 is a block diagram illustrating one example of an apparatus for processing program instructions in accordance with one embodiment of the invention.

FIG. 2 illustrates one example of an apparatus 200 for processing program instructions that may be included in each of the processing units 12a and 12b. In this example, the apparatus 200 includes an instruction cache 202, an instruction multiplexer 204, an instruction cache controller 206, a first buffer 208, an instruction aligner 210, an instruction aligner controller 212, an instruction converter 214, a multiplexer 216, a second buffer 218, and a plurality of arithmetic logic units 220a–220n that may include control logic 222. One or more flag registers 224 contain flags that are modified as required by the variable length instructions being executed. The flag registers may be distributed flag registers, meaning flag registers that are located throughout the processor, as desired.

The bus 24 may transfer variable length instructions, referred to herein as normative instructions, and fixed length instructions, referred to herein as native instructions. Native instructions are typically communicated to processing units 12a and 12b through bus 24 from memory 16 and cached in instruction cache 202. Variable length instructions (e.g., non-native instructions) are typically communicated through a bus 24 from memory 16.

The instruction cache 202 may be any suitable instruction cache that can cache variable length instructions, as well as fixed length instructions. The multiplexer 204 receives instructions 226 from the instruction cache 202 and/or instructions directly from the bus 24, indicated as instructions 228. The instruction cache controller 206, as known in the art, controls the multiplexer 204 to output selected instructions 230 for execution by, for example, one or more ALUs or other instruction execution stages. The selected instructions 230 are buffered in the first buffer 208 to allow the instruction aligner 210 to suitably align the variable length instructions under control of aligner controller 212. Any suitable variable length instruction alignment mechanism may be used. For example, a suitable instruction alignment mechanism may be one such as that found in co-pending application entitled "Variable Length Instruction Alignment Device and Method," filed by T. R. Ramesh et al., having Ser. No. 09/490,888, owned by instant Assignee and incorporated herein by reference. Once the selected variable length instructions are suitably aligned, the converter 214 converts the one or more aligned variable length instructions to a plurality of native fixed length instructions through the use of hardwired logic indicated as 240. The aligned variable length instructions 238 may also be of a complex type such that conversion is not appropriate.

Converted instructions typically result in fewer than eight native instructions. When converting, the converter 214 converts, for example, variable length X86 instructions to a plurality of resulting native instructions 240. The plurality of resulting native instructions 240 may include at least one flag modification enable bit 32 set to allow changing of non-native instruction flags in the flag register 224, in response to execution of the plurality of native instructions, by, for example, an ALU instruction execution stage.

However, for the unconvertible non-native instructions 242, the converter generates an unconvertible instruction command indicating that emulation of the normative instruction should be performed since conversion was not appropriate. The converter 214 generates the unconvertible instruction command in response to detecting that the X86 instruction is not convertible by the converter 214. The controller 222, upon receiving the unconvertible non-native instruction then requests the software instruction emulation module 18 to emulate the unconvertible non-native instruction 242. If a native instruction is received on the bus 24, no conversion is necessary and the native instruction 244 will pass to the multiplexer 216.

The controller 222 may be any suitable control logic and may be a part of one or more ALUs 220a–220n, or part of a converter or any other suitable block. The controller 222 controls the multiplexer 216 to output native instruction 244 and native instructions 240 resulting from a conversion, or unconvertible non-native instruction 242 into the second buffer 218. The controller 222 knows which of the input information 240 and 244 to output to the second buffer, based on which instruction is being executed. Accordingly, the controller 222 outputs an address select signal 250 to control the multiplexer 216 to output a selected instruction 252 for storage in the second buffer 218. The second buffer 218, receives the instruction containing the operational code and data representing at least one flag modification enable bit in the form of native instruction 244 or a native instruction 240 resulting from conversion. The controller 222 emits a command to buffer 218 to supply ALUs 220a–220n with instructions. The controller 222 analyzes the instruction 256 taken from the second buffer 218 to determine whether the flag modification enable bit 32 (assuming a native instruction) allows modification of a flag in the flag register, in response to executing the operational code embedded in the native instruction. The controller 222 accordingly receives flag status data 258 indicating the status of the flag modification enable bit 32. If the flag modification enable bit 32 indicates allowance of flag updates for the flag register, the controller 222 generates a flag update command 260 to update one or more flags in the flag register 224 in response to determining the status of the one flag modification enable bit 32. The flag register 224 is operatively coupled to the controller 222 so that the controller can update a flag in the flag register if the native instruction flag modification native bit 32 is set to allow modification of the flag in the flag register. The ALUs perform integer instructions, e.g., add, subtract, etc., in native instructions then the control logic (controller) checks if the flag modification enable bit is set and updates flag reg if the bit is not set. The controller 222 may also, if desired, provide the ALU execution stage with pipeline control information 262 indicating, for example, source operand availability.

In this embodiment, where the ALUs execute the native instructions containing the flag modification enable bits, the received instructions 256 include at least one of an integer instruction, an arithmetic instruction and a logical instruction. However, it will be recognized that non-integer instructions may also employ flag modification enable bits as desired. The ALUs may be any suitable arithmetic logic units, and may be, for example, of a type described in co-pending application entitled "Method and Apparatus of Configurable Processing," filed by inventors Korbin Van Dyke et al., having Ser. No. 09/376,830, filed on or about Aug. 18, 1999 owned by instant assignee and incorporated herein by reference.

Figure 3:
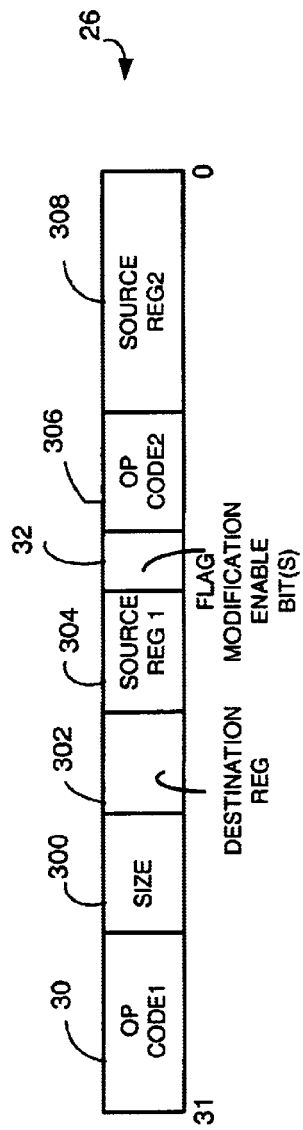
FIG. 3 is a diagram illustrating one example of a native instruction format that includes flag modification enable bits in accordance with one embodiment of the invention.

Referring to FIG. 3, one example of a native instruction 26 contains the flag modification enable bit 32, first operational code 30 (op code), size information 300, indicating, for example, the size of the operation which may be, for example, a 16-bit, 32-bit, 64-bit, 128-bit or any other suitable size, destination register of the operation 302 indicating, for example, where to store results of the operation, first source register information 304 indicating the first register containing input data to the operation, second op code 306, second source information indicating the second register containing input data, and any other suitable information as desired. The native instruction 26 may be, for example, an add, subtract, multiply, divide, increment, decrement, negation, rotate, shift, XOR, AND, OR, or any other suitable instruction, for example, executable by the arithmetic logic units. The flag modification enable bit 32 may be designed so that if the bit is a "0" the flag settings in the flag registers cannot be affected through execution of the native instruction containing the flag modification bit, or if the bit is set to a logic 1, this state may indicate that the flag value may be modified based on the operation performed consistent with the native instruction.

The native instruction 26 as shown includes at least one input operand and at least one destination operand (302 and 304), respectively.

The software instruction emulation module 18, when executed by one or more of the processing units 12a, serves as a variable length instruction emulator that uses fixed length native instructions to emulate variable length instructions. Programmers of software emulation module 18 typically set the flag modification enable bit of each native instruction to preserve flag bit settings for variable length instructions that are emulated using the fixed length native instructions. The non-native instruction emulator 18 emulates unconverted variable length X86 instructions, for example, using a plurality of native instructions wherein the native instructions include the flag modification enable bit that may be set to prevent changing of non-native instruction flags in response to execution of the plurality of native instructions that are used to emulate the unconverted variable length instruction.

Figure 4:
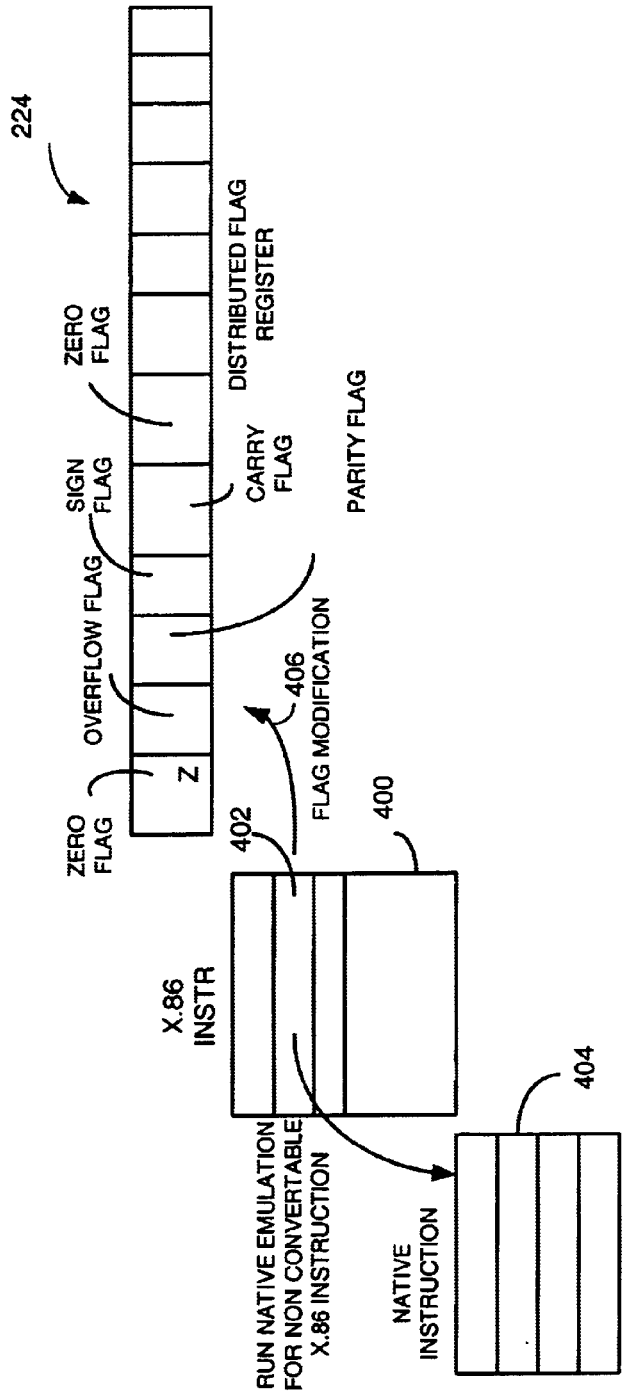
FIG. 4 is a graphic illustration depicting native emulation for nonconvertible variable length instructions and flag modification for converted variable length instructions in accordance with one embodiment of the invention; and FIG. 5a and FIG. 5b is a flow chart illustrating one example of the operation of the apparatus shown in FIG. 2.

FIG. 4 graphically illustrates a queue of X86 instructions 400 wherein X86 instruction 402 is not convertible. It is therefore emulated using native instructions from the native instruction set 404. In addition, the converter produces a sequence of native instructions. Where the native instructions have been generated based on conversion, the flag modification operation 406 is performed to modify one or more of the necessary flags in the flag register 224 as required by the native instructions. Flag register 224, by way of example, and not limitation, indicates various flags that may be set. For example, a zero flag, overflow flag, parity flag, sign flag, carry flag, or any other suitable flags.

Figure 5A:
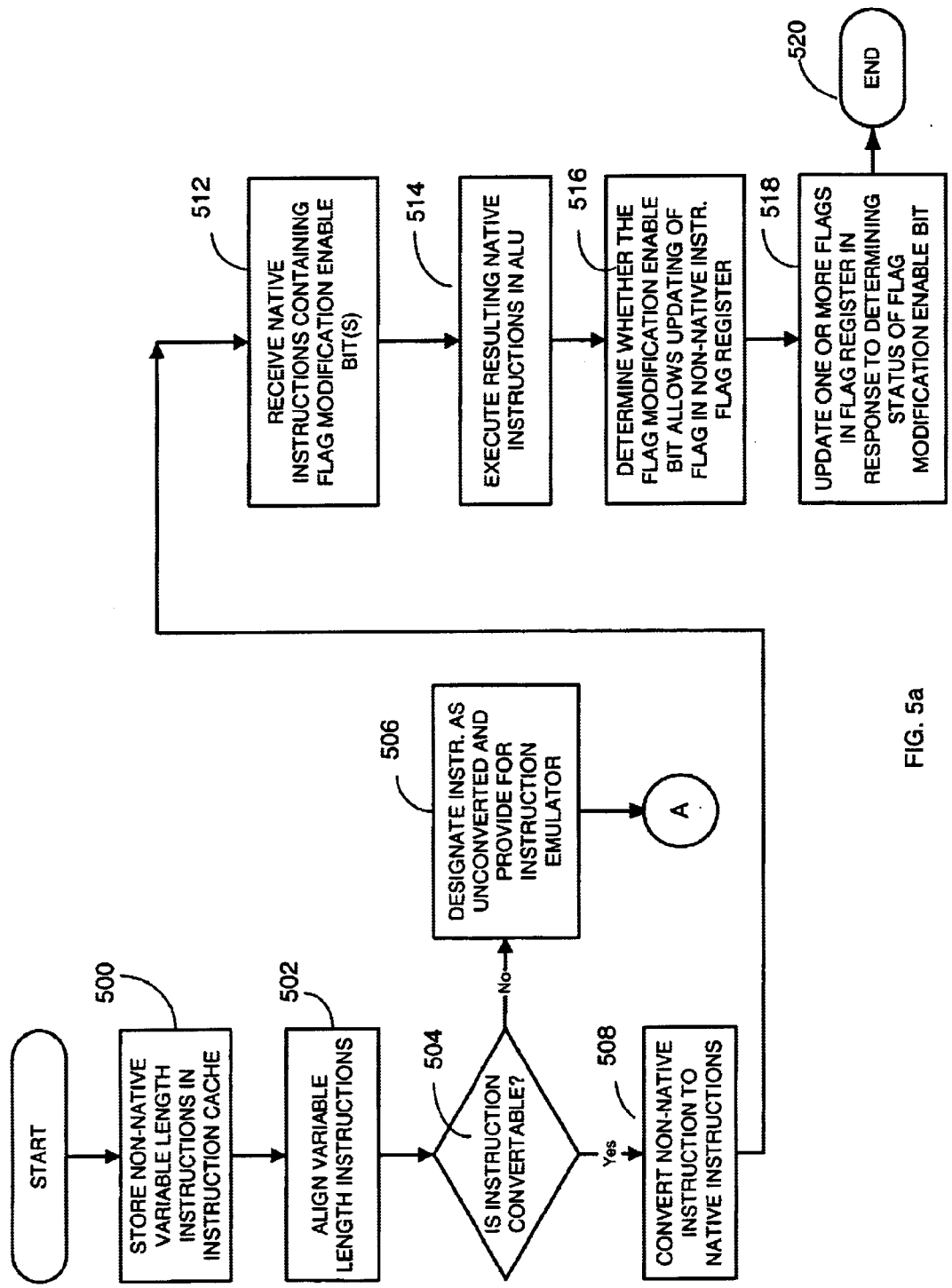
Figure 5B:
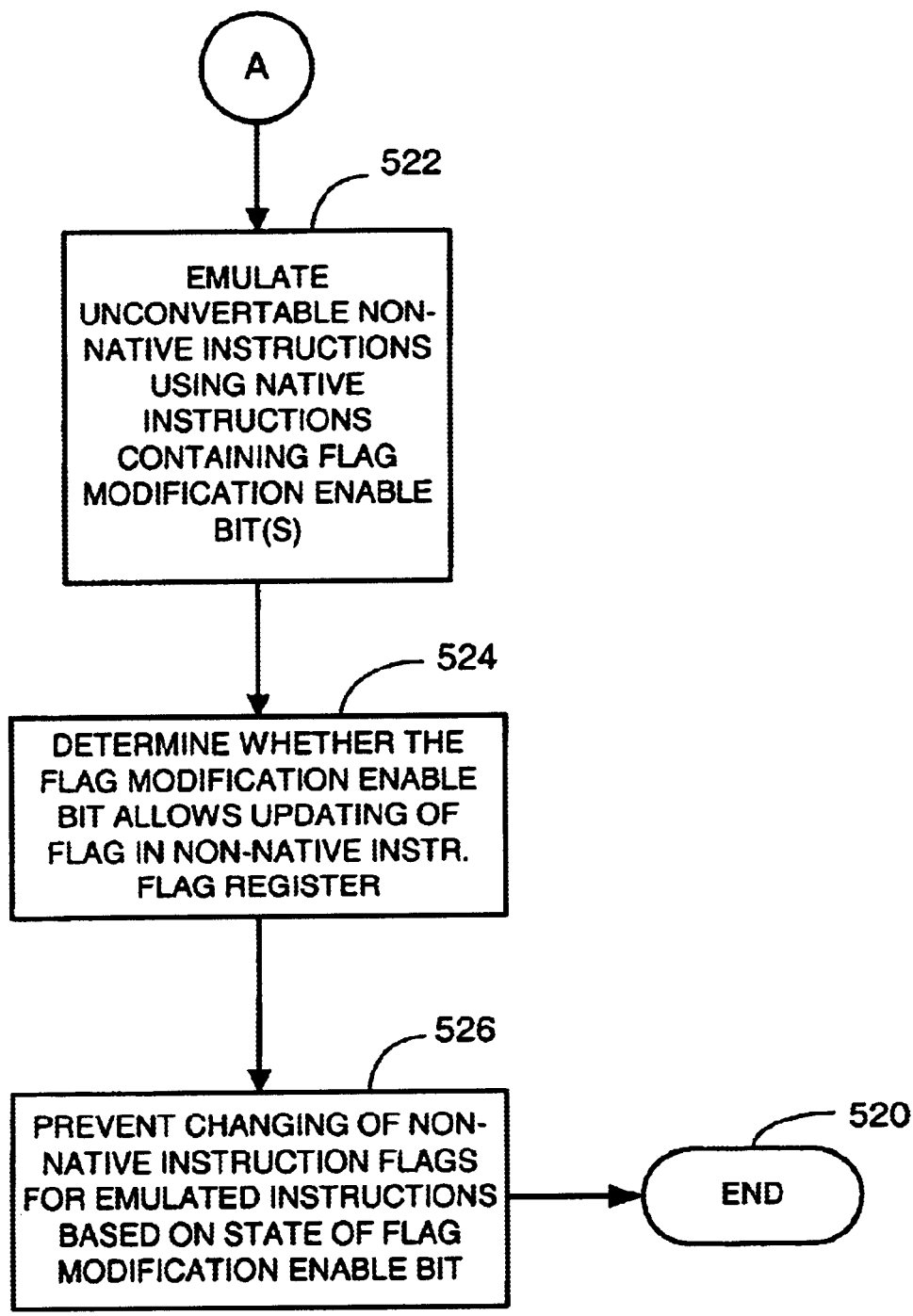

FIGS. 5a and 5b illustrate one example of the operation of the system of FIG. 2 wherein the process includes storing received non-native variable length instructions in the instruction cache as shown in block 500. Since the non-native instructions are variable length and fetched in fixed length groups, the process includes aligning the variable length instructions, as shown in block 502, using the aligner 210. As shown in block 504, the converter, or other suitable logic, determines if the received variable length instruction is directly convertible to a plurality of native instructions. If the variable length instruction is unconvertible, the process continues as shown in block 506, by designating the instruction as unconverted, by using, for example, an unconvertible instruction command. This unconvertible instruction is then emulated by the software instruction emulation module. This may be carried out, for example, by the CPU calling the emulation module upon detection of the unconvertible instruction command. The unconvertible instruction command may be any suitable data, such as any bits or any other suitable information such as appended to or indexed with the unconvertible variable instruction.

However, if the aligned variable length instruction is convertible to a plurality of native instructions containing the flag modification enable bit, the process continues as shown in block 508 to convert the non-native instruction to native instructions. For example, an X86 ADD instruction where one operand is memory and the sequence is
LDA T, MEM ADD
ADD Dest, T As shown in block 512, the buffers or ALUs receive the native instructions containing the flag modification enable bits. The appropriate ALU then executes the resulting native instructions from the conversion as shown in block 514. As shown in block 516, the ALU determines whether the flag modification enable bit allows updating of the flag in a non-native instruction flag register, such as register 224. As shown in block 518, since the native instructions have been generated through conversion, the flag modification enable bit should be set so that it allows setting of flags. Accordingly, the process includes updating one or more flags in the flag register in response to determining the status of the modification enable bit. The process then ends for that instruction and continues for other instructions, as shown in block 520.

Referring back to block 506, if the instruction received from the bus 24 has been designated as an unconverted instruction so that it is passed for emulation by the instruction emulator, the process includes, as shown in block 522, emulating the unconvertible non-native instructions using native instructions containing the flag modification enable bits. The native instructions used to emulate the unconvertible normative instructions typically have the flag modification enable bits set to prevent updating of the flag register 224 to avoid overwriting of flags that may be being set by other instructions that are being executed. As shown in block 524, the process includes determining whether the flag modification enable bit allows updating of the flag in the non-native instruction flag register (flag register 224) so that, for example, if the bit is set to prevent changing, as shown in block 526, the process includes preventing changing of flags for the emulated instructions based on the state of the flag of the modification enable bit for a given native instruction.

Accordingly, the above apparatus and methods can provide multi-instruction set processing units with faster execution by allowing some instructions to be converted for direct execution by an ALU. However, for those instructions that require emulation, flags may be prevented from being modified during the execution of emulation to eliminate the need to save and restore the flag registers. Hence, the disclosed apparatus and method allow flexibility in the ordering of instructions and the modification of flags and use of flags.

It should be understood that the implementation of other variations and modifications of the invention in its various aspects will be apparent to those of ordinary skill in the art, and that the invention is not limited by the specific embodiments described. For example, the apparatus and methods may be implemented using any suitable combination of hardware, software and firmware. Also, the functions of one element may be shared or varied to other suitable elements as desired. It is therefore contemplated to cover by the present invention, any and all modifications, variations, or equivalents that fall within the spirit and scope of the basic underlying principles disclosed and claimed herein.

What is claimed is:

1. A method for processing program instructions comprising the steps of:
   receiving at least one non-native instruction containing data representing operational code and at least one non-native instruction flag;
   emulating the at least one non-native instruction using at least one native instructions including a flag modification enable bit;
   determining whether the at least one flag modification enable bit allows updating of the at least one non-native instruction flag in response to emulating the at least one non-native instruction; and
   updating the at least one non-native instruction flag in response to determining whether the at least one flag modification enable bit allows updating of the at least one non-native instruction flag.

2. The method of claim 1 wherein the at least one instruction is at least one of:
   an integer instruction, an arithmetic instruction and a logical instruction.

3. The method of claim 1 wherein the at least one instruction includes at least one input operand.

4. The method of claim 1 wherein the step of updating the at least one non-native instruction flag in response to determining whether the at least one flag modification enable bit allows updating of the at least one non-native instruction flag includes updating a flag register if the flag modification enable bit is set to allow modification of a flag in the flag register.

5. The method of claim 1 including the steps of:
   providing a variable length instruction emulator that uses fixed length native instructions to emulate variable length instructions; and
   evaluating the flag modification enable bit to preserve flag bit settings for variable length instructions that are emulated using the fixed length native instructions.

6. The method of claim 1 wherein the at least one native instruction is a fixed length instruction.

7. The method of claim 1 including the step of emulating non-native instructions using native instructions containing the flag modification bit.

8. The method of claim 1 wherein the non-native instructions are variable length X86 instructions.

9. The method of claim 8 including the steps of:
   converting variable length X86 instructions to a plurality of native instructions wherein the plurality of native instructions include the at least one flag modification enable bit set to allow changing of non-native instruction flags in response to execution of the plurality of native instructions; and
   emulating unconverted variable length X86 instructions using a plurality of native instructions wherein the native instructions include the at least one flag modification enable bit set to prevent changing of non-native instruction flags in response to execution of the plurality of native instructions.

10. An apparatus for processing program instructions comprising:
    a buffer coupled to receive at least one non-native instruction containing data representing operational code and at least one non-native instruction flag;
    a variable length instruction emulator that emulates non-native instructions using at least one native instructions containing the flag modification enable bit; and
    a controller operatively responsive to the at least one instruction stored in the buffer, that determines whether the at least one flag modification enable bit allows updating of the at least one non-native instruction flag in response to executing the operational code and in response to determining whether the at least one flag modification enable bit allows updating of the at least one flag.

11. The apparatus of claim 10 wherein the at least one instruction is at least one of: an integer instruction, an arithmetic instruction and a logical instruction.

12. The apparatus of claim 11 wherein the at least one instruction includes at least one input operand.

13. The apparatus of claim 10 including a flag register operatively coupled to the controller, wherein the controller updates a flag in the flag register if the flag modification enable bit is set to allow modification of the flag in the flag register.

14. The apparatus of claim 10 including a variable length instruction emulator that uses fixed length native instructions as the at least one instruction, to emulate variable length instructions.

15. The apparatus of claim 10 wherein the at least one native instruction is a fixed length instruction.

16. The apparatus of claim 14 wherein the variable length instruction emulator emulates non-native instructions using native instructions containing the flag modification bit.

17. The apparatus of claim 10 wherein the non-native instructions are variable length X86 instructions.

18. The apparatus of claim 17 including;
    an instruction converter, operatively coupled to receive variable length X86 instructions, that converts the received variable length X86 instructions to a plurality of native instructions wherein the plurality of native instructions include the at least one flag modification enable bit set to allow changing of non-native instruction flags in response to execution of the plurality of native instructions; and a non-native instruction emulator operatively responsive to an unconvertible instruction command generated in response to detecting that an X86 instruction is not convertible by the converter, wherein the non-native instruction emulator emulates unconverted variable length X86 instructions using a plurality of native instructions wherein the native instructions include the at least one flag modification enable bit set to prevent changing of non-native instruction flags in response to execution of the plurality of native instructions for the unconverted variable length instruction.

19. A method for processing program instructions comprising the steps of:

receiving at least two non-native instructions containing data representing operational code and at least one non-native instruction flag;

emulating the at least two non-native instructions using at least one native instruction including a flag modification enable bit;

determining whether the at least one flag modification enable bit allows updating of at least one flag register associated with the at least one non-native instruction flag in response to emulating the at least two non-native instructions; and updating the at least one flag register in response to determining whether the at least one flag modification enable bit allows updating of the at least one flag.

20. The method of claim 19 including preventing updating of the at least one flag register in response to determining whether the at least one flag modification enable bit allows updating of the at least one flag.

* * * * *